Patented Sept. 13, 1949

2,481,895

UNITED STATES PATENT OFFICE 2,481,895

PRESSURE-SENSITIVE ADHESIVE TAPE

Paul F. Ziegler, Winnetka, Ill., assignor to The Kendall Company, Boston, Mass., a corporation of Massachusetts No Drawing. Original application December 10, 1943, Serial No. 513,711. Divided and this application August 20, 1948, Serial No. 45,440

4 Claims. (Cl. 117—122)

This invention relates to pressure-sensitive adhesive tapes, and more particularly to the preparation of such tapes wherein the adhesive thereof comprises a polyvinyl pressure-sensitive adhesive, and wherein the backing may be a transparent, non-fibrous sheet material such as regenerated cellulose.

An accepted backing material for transparent pressure-sensitive adhesive tapes is regenerated cellulose. Because of its smooth, non-fibrous, glossy surface, commercially satisfactory regenerated cellulose adhesive tapes have included a priming coat for the purpose of improving the bond between the pressure-sensitive adhesive and the backing by creating a preferential affinity of the adhesive for the surface of the primed backing to which it is applied, compared with its affinity for the surface of the backing without the interposition of the priming coat, and thus permit, after the tape has been wound upon itself in roll form, successful unrolling thereof without destructive separation or delamination of the adhesive from the backing. Rubber-resin adhesives generally used as pressure-sensitive adhesives in such tapes do not have commercially sufficient adhesion, when applied directly to the smooth glossy surface of regenerated cellulose in the absence of a priming coat or of some special technique of application, to permit such satisfactory unrolling.

This application is concerned with the preparation of non-rubber polyvinyl resin pressure-sensitive adhesives which may be directly affixed as firmly adherent coatings to regenerated cellulose or other similar smooth-surfaced transparent sheet backings and is a continuation-in-part of my application Serial No. 349,973, filed August 2, 1940, now Patent No. 2,426,257, and is a division of my prior application Serial No. 513,711 filed December 10, 1943.

The foregoing application discloses inter alia the preparation of pressure-sensitive adhesives formed of a polyvinyl ester, a resin compatible with the polyvinyl ester, and a non-volatile liquid plasticizer compatible with both the polyvinyl ester and the resin; wherein the polyvinyl ester serves as the film-forming vehicle for the adhesive and is present in sufficient proportion to impart structural supporting characteristics which permit the formation of a relatively thin continuous cohesive flexible coating thereof on a flexible sheet backing, inclusive of regenerated cellulose, to form a pressure-sensitive adhesive tape.

In so far as tapes having regenerated cellulose backings are concerned, such an adhesive has been found to have a remarkable affinity for the regenerated cellulose surface to which it has been applied when the adhesive is prepared in accordance with the following formula:

| | Parts |
|---|---|
| Vinyl co-polymer VYHH | 30 |
| Nevillac resin | 30 |
| Santicizer B16 (butyl phthalyl butyl glycollate) | 42 |

The vinyl co-polymer is a standard polyvinyl resin of the acetate-chloride type and in the form which has been used for the adhesives hereof has a chloride content of about 87% and a molecular weight of about 9,500–10,500. It is a product of Carbide & Carbon Chemicals Corporation. It constitutes the film-forming vehicle and is responsible for the elastic and cohesive characteristics of the adhesive.

The Nevillac resin is a phenol-modified coumarone-indene resin, a product of Neville Company, and as used in the above formula, has a melting point in about the range of 85 to 95° C. It forms the adhesive constituent of the adhesive.

Santicizer B16 is one of the Monsanto Chemical Company's non-volatile liquid plasticizers which are alkyl phthalyl alkyl glycollates. This particular Santicizer B16 is butyl phthalyl butyl glycollate. It activates the Nevillac resin to stickiness and renders the adhesive coating as a whole flexible.

These three ingredients may be added to a common organic solvent, such as ethyl acetate or acetone, in the order of plasticizer, co-polymer and Nevillac. The solvent can then be driven off as necessary to a point where the solids content is suitable for spreading as by a doctor blade or roll on regenerated cellulose sheet material, for example to about 50 to 80%, preferably 75%. Both the mixing and spreading may be accomplished at room temperature, but artificial drying may be helpful in driving off the solvents after the solution is spread upon the backing. It has been found that the tack of the coating improves as the thickness increases from .002″ to .005″. Hence the thicker coat is desirable.

A regenerated cellulose sheet, thus directly coated with my transparent adhesive in a one-coat operation without any interposed primer coat, may be slit and rolled and will meet the commercial requirements for a transparent cellophane pressure-sensitive adhesive tape. The roll may be unwound without delamination of the adhesive onto the backing even in the absence of separate interliners, and the tape can, like the usual cellophane tapes, be re-used. The adhesive, which is clear and transparent, ages well and has good adhesion to metal, wood, paper and other materials to which cellophane tapes are now generally applied. The adhesion to skin is, however, not as aggressive as that of rubber-resin pressure-sensitive adhesives. This particular quality has been found to be a decided advantage because the tape is thus less sticky and less annoying to handle.

The proportions and ingredients so far recited represent the best formula with Hard Nevillac resin (i. e. 85–95° C. melting point) for general regenerated cellulose use. It should be noted that the film-forming ingredient and adhesive resin constituent are in a 1 to 1 ratio. Variation of this ratio is permissible, but experience shows that variation has resulted in sacrifice in quality, particularly with regard to the affinity for the regenerated cellulose. A decrease in vinyl polymer content, so that the ratio is 20–40–42, instead of 30–30–42, will result in a decrease in the adhesion and cohesion characteristics, but will increase the track. On the other hand, if the plasticizer content be independently varied within the limits of from 90 to 50% of the combined vinyl polymer-resin base, the adhesion and cohesion will increase with decrease of plasticizer content, but the tack will decrease. In our experience, the 1 to 1 ratio provides the most desirable qualities of adhesion and cohesion for the purposes of a regenerated cellulose tape, and the tack can be kept suitably high with this ratio by the use of a higher proportion, e. g., 70% of plasticizer, aided, if desired, by a coating thickness of about .005". In any event, the film-forming vehicle content must be sufficiently high to give adequate cohesive strength to the adhesive coat, and, in accordance with this invention, must exceed 12% of the total content.

Equally successful results have been secured with the use of softer Nevillac resins, which range down to a melting point of about 65° C. These softer resins are also phenol modified coumarone-indene resins. Use of such softer resin permits a reduction in the plasticizer content, and, from the standpoint of cost and lighter color, an adhesive having the following formula is even more desirable than one following the Hard Nevillac formula:

|  | Parts |
|---|---|
| Vinyl co-polymer VYHH | 30 |
| Soft Nevillac resin | 30 |
| Santicizer B16 (butyl phthalyl butyl glycollate | 36 |

It will be noted that here the plasticizer content is in the ratio of .6 to the combined vinyl co-polymer and Nevillac content. Generally this plasticizer ratio may be .1 part less (figured on the combined co-polymer resin content) than in the case of the Hard Nevillac formula where, as above given, the ratio is .7. However, additional plasticizer variation will produce corresponding variation in tack, adhesion and cohesion results, generally corresponding to those heretofore discussed in the case of the Hard Nevillac.

In tapes constructed in accordance with this invention the adhesion of the tape mass to other regenerated cellulose surfaces may be in the range of from 0.6 to 1.2 or more pounds and the mass coating exhibits substantially the same degree of adhesion to its regenerated cellulose backing as it does to an external regenerated cellulose surface.

For the purposes of determining "adhesion" to external surfaces, as referred to in the preceding paragraph, a one-inch wide strip of convenient length of the tape to be tested is placed tacky surface down upon a smooth surfaced Bakelite panel under temperature conditions of 70° F. The panel is then placed at a 15° inclined position and a seven-pound roller which is free to move vertically is passed over the strip at the rate of one foot per minute up and back to adhere the pressure-sensitive surface to the panel. One end of the strip is then attached to the clamp of a tensile strength Scott tester and the average number of pounds required to pull a substantial length of the tape off the Bakelite surface at an approximate 180° angle and at a rate of one foot per minute is determined.

For the purposes of determining adhesion of a coating to its own backing, a double-face adhesive strip is interposed between the Bakelite panel and the strip to be tested. Such a double-face adhesive tape may be an ordinary surgical tape coated on both sides. The regenerated cellulose tape to be tested is then separated at one end of the tape from the adhesive mass and the clamp of the tester is affixed to this backing alone, the tester stripping the regenerated cellulose backing from its own mass which remains adherent to the double-face tape.

In addition to adhesion characteristics of the above type, it has been found that the mass film has extensive stretchability and a tensile strength in a one-inch width of about ⅜ pounds at 70° F. These latter characteristics, taken in connection with the adhesion characteristics, are factors contributing to the production of a tape which does not delaminate upon unrolling.

Cohesion of the above referred to masses are shown to be such that they have a "creep" characteristic exceeding 20 minutes as determined by placing a one-inch strip of the tape of several inches length, tacky side down, over a horizontally disposed, raised, one-inch diameter Bakelite cylinder, and suspending a one-pound weight from each end of the tape. The apparatus is then placed in an oven at 105° F. for a period of 15 minutes, after which time the tape is slashed across the top of the cylinder and the time required for either portion of the tape to fall from the cylinder is an arbitrary value assigned to the tape as its "creep" value. Some tapes of this invention reach a creep value exceeding 100 minutes.

A further determinative characteristic of adhesive tapes is that of aging. Tapes of this invention have successfully withstood a standard accelerated aging test comprising storage of the tape under 300 lbs. oxygen pressure at 105° F. for a period of one week. After such storage the tapes are still tacky and having adhesion values, determined in accordance with the previously given test, in excess of 0.6 lb., they can still be unrolled without delamination and instances of similar behavior have occurred even when the period in the oxygen bomb is as much as 3 weeks.

A further desirable feature is found in these tapes in that they exhibit a definite stability over a range of temperature and can be unwound without any detrimental delamination of the adhesive at any temperature in ranges as wide as from 40 to 160° F.

The Monsanto Chemical Company produces "Santolite" resins which may be successfully used instead of Nevillac resins. These Santolite resins are aryl sulphonamide-formaldehyde resins. Santolite MHP, preferred because of its light color, has a melting point of about 65° C. and therefore its action is more similar to that of the soft Nevillac resin and should be used in the proportion of the soft Nevillac resin. Santolite MS, being a still softer resin (melting point=50° C.) detracts somewhat from the cohesion and requires a still further reduction in plasticizer with the plasticizer content, in some cases, being as low as 30% of the combined co-polymer resin content. However, it is contemplated that adhesives of this invention may be applied to suitable backings by a calendering operation rather than by a solvent spread as hereinbefore described. Thus the ingredients may be mixed and brought to the proper consistency for spreading by transferring the mix to a hot rubber mill to dissolve the solvent; or in some cases of relatively high resin-plasticizer content (for instance, 2 parts of co-polymer to 3 parts of resin and 3 parts of plasticizer), the co-polymer may be dissolved directly in a hot (140–150° C.) mixture of the resin and plasticizer and calendered at that or a lower temperature.

With regard to the film-forming vehicle, the superior results accomplished on cellophane with the co-polymer have not been attained with other polyvinyl esters, although polyvinyl acetate will be found acceptable especially when a smooth-surfaced backing is not contemplated or when priming coats are permissible. In general, polyvinyl acetate has softer characteristics than that of the co-polymer and therefore imparts less cohesive strength to an adhesive, while polyvinyl chloride has limited solubilities, a characteristic which renders solvent operations difficult.

In the case of polyvinyl acetate, pure phenolic resins (Beckacite) may be satisfactorily used as well as Nevillac. The Beckacite resins are not compatible with the co-polymer.

As to the plasticizer, modifications can be made so long as compatibility in the proportions used is observed. Other satisfactory plasticizers for the Nevillac-co-polymer mix, though not preferred, are other non-volatile liquid esters of phthalic acid, including either the dialkyl phthalates—dibutyl phthalate and dicapryl phthalate—or other mixed esters of phthalic acid and alcohols or hydroxy acids, dibutyl sebacate and mixed aryl sulfonamides, such as Santicizer 8 (Monsanto Chemical Co.). Either dibutyl phthalate or Santicizer B16 are compatible with polyvinyl acetate-phenolic resin mixes.

Adhesives may be suitably formulated in accordance with this invention for application to other sheet backings, either of the non-fibrous or fibrous variety, including woven or unwoven fibrous backings and smooth surfaced backings of the type of cellulose acetate, ethyl cellulose, polyvinyl ether, rubber hydrochloride or polyamides such as sheet nylon.

I claim:
1. A pressure-sensitive adhesive tape comprising a flexible smooth-surfaced non-fibrous sheet backing material having affixed directly thereto on one side a firmly adherent coating of a normally tacky pressure-sensitive adhesive, whereby said tape may be rolled upon itself and unrolled without destructive delamination of the tape, said adhesive consisting essentially of a polyvinyl acetate-chloride co-polymer film-forming vehicle and a compatible normally solid aryl sulphonamide-formaldehyde resin in about equal proportions, and a non-volatile liquid alkyl phthalyl alkyl glycollate plasticizer compatible with both said co-polymer and said resin in the proportion of about 30–90% of the combined weight of said copolymer and resin.

2. A pressure-sensitive adhesive tape comprising a flexible smooth-surfaced non-fibrous sheet backing material having affixed directly thereto on one side a coating of a normally tacky pressure-sensitive adhesive, said adhesive being formed of a polyvinyl acetate-chloride co-polymer film-forming vehicle, aryl sulphonamide-formaldehyde resin and a non-volatile liquid alkyl phthalyl alkyl glycollate plasticizer compatible with both said polymer and said resin, the proportion of ingredients being about 20–30 parts of co-polymer, about 30–40 parts resin and about 36–42 parts plasticizer.

3. A pressure-sensitive tape as claimed in claim 2 wherein the plasticizer is butyl phthalyl butyl glycollate.

4. A pressure-sensitive adhesive tape comprising a flexible smooth-surfaced non-fibrous sheet backing material having affixed directly thereto on one side a firmly adherent coating of a normally tacky pressure-sensitive adhesive, whereby said tape may be rolled upon itself and unrolled without destructive delamination of the tape, said adhesive consisting essentially of a polyvinyl acetate-chloride co-polymer film-forming vehicle and a compatible normally solid aryl sulphonamide-formaldehyde resin having a melting point from 50–95° C., said co-polymer and said resin being in about equal proportions, and a non-volatile liquid plasticizer compatible with both said co-polymer and said resin in the proportion of about 30–90% of the combined co-polymer resin weight.

PAUL F. ZIEGLER.

REFERENCES CITED

The following references are of record in the file of this patent:

UNITED STATES PATENTS

| Number | Name | Date |
| --- | --- | --- |
| 1,902,257 | Moss | Mar. 21, 1933 |
| 2,247,154 | Geiger et al. | Jan. 24, 1941 |